United States Patent [19]

Wondrazek et al.

[11] Patent Number: 4,775,211
[45] Date of Patent: Oct. 4, 1988

[54] DETACHABLE CONNECTION BETWEEN A LIGHT-GUIDE FIBER AND A LASER

[75] Inventors: Fritz Wondrazek, Pfaffenhofen; Andreas Hahn, Sauerlach, both of Fed. Rep. of Germany; Wolfram Einars, Thun, Switzerland

[73] Assignee: Messerschmitt-Bölkow-Blohm GmbH, Munich, Fed. Rep. of Germany

[21] Appl. No.: 806,767

[22] Filed: Dec. 9, 1985

[30] Foreign Application Priority Data

Dec. 8, 1984 [DE] Fed. Rep. of Germany ....... 3444823

[51] Int. Cl.$^4$ ............................ G02B 6/36; G02B 7/26
[52] U.S. Cl. ................................. 350/96.20; 350/96.21
[58] Field of Search ............................ 350/96.20, 96.21

[56] References Cited

U.S. PATENT DOCUMENTS 4,199,222  4/1980  Ikushima et al. ................ 350/96.20

*Primary Examiner*—William L. Sikes
*Assistant Examiner*—Robert E. Wise
*Attorney, Agent, or Firm*—Kenyon & Kenyon

[57] ABSTRACT

A detachable connection between a light-guide fiber and a laser suited particularly for medical purposes comprises two coupling elements. In the light exit opening of the first coupling element an optical coupling system is arranged which is connected to the former and can be adjusted parallel and/or perpendicularly to the optical axis. The first coupling element comprises a device for generating an axial force on the second coupling element. Between the first and second coupling elements, contact surfaces with high thermal conductivity are provided, by means of which heat is transferred in the coupled condition from the second coupling element to the first coupling element.

10 Claims, 3 Drawing Sheets

DETACHABLE CONNECTION BETWEEN A LIGHT-GUIDE FIBER AND A LASER

BACKGROUND OF THE INVENTION

The present invention relates to a detachable connection between a light-guide fiber and laser equipment, especially for medical purposes, having a first coupling element on the laser side and a second coupling element on the light-guide fiber side, which can be plugged into a light exit opening of the first coupling element.

A connection of the above-mentioned type for a photo coagulator is known from DE-OS No. 31 21 287. This equipment consists of a laser of suitable power rating and wavelength, to which a light-guide fiber is connected via a special coupler with optical elements. The coupling element therein described on the light-guide fiber side forms, with an optical coupling system and the light-guide fiber, a unit which is inserted into the parallel ray path of a laser by means of a coupling element on the laser side. Such a light guide is relatively expensive and must be sterilized after every treatment, whereby the danger of damaging the optical components exists. Since the dimensions of plug-in devices for light-guide fibers are generally small, handling them requires a certain degree of dexterity on the part of the user. The coupling elements, which are made with great precision, can jam easily and be damaged by the use of force.

SUMMARY OF THE INVENTION

It is an object of the present invention to provide a detachable connection between a light-guide fiber and laser equipment which is simpler and therefore cheaper to manufacture than the connections known heretofore and which is protected against damage in handling and during operation.

The above and other objects of the present invention are achieved by a detachable connection between a light-guide fiber and laser equipment, especially for medical purposes, comprising a first coupling element adapted to be attached to the laser equipment and a second coupling element adapted to be attached to the light-guide fiber, the second coupling element being pluggable into a light-exit opening of the first coupling element, an optical coupling system (optical transmission means or lens) being disposed in the light exit opening of the first coupling element and coupled to the first coupling element, the optical coupling system being adjustable at least one of parallel and perpendicularly to an optical axis of the optical coupling system, the first coupling element comprising means for generating an axial force on the second coupling element, contact surfaces having high thermal conductivity being provided between the first and second coupling elements by means of which heat is transferred from the second coupling element to the first coupling element when the first and second coupling elements are coupled together.

By relocating the optical coupling system into the coupling element on the laser side, the essentially purely mechanical coupling element on the light-guide fiber side can either readily be sterilized after every use or can be produced so cheaply that the light-guide fiber with the associated coupling element can be used economically as a throw-away instrument. Due to the provision of a device for generating an axial force on the coupling element on the light-guide fiber side, the connection is self-plugging and thus is no longer dependent on the dexterity of the operator. By the provison of good heat transfer between the coupling elements, overheating due to unavoidable coupling losses is prevented.

BRIEF DESCRIPTION OF THE DRAWINGS

The invention will be explained in greater detail in the following detailed description with reference to the drawings, in which.

DETAILED DESCRIPTION

Figure 1:
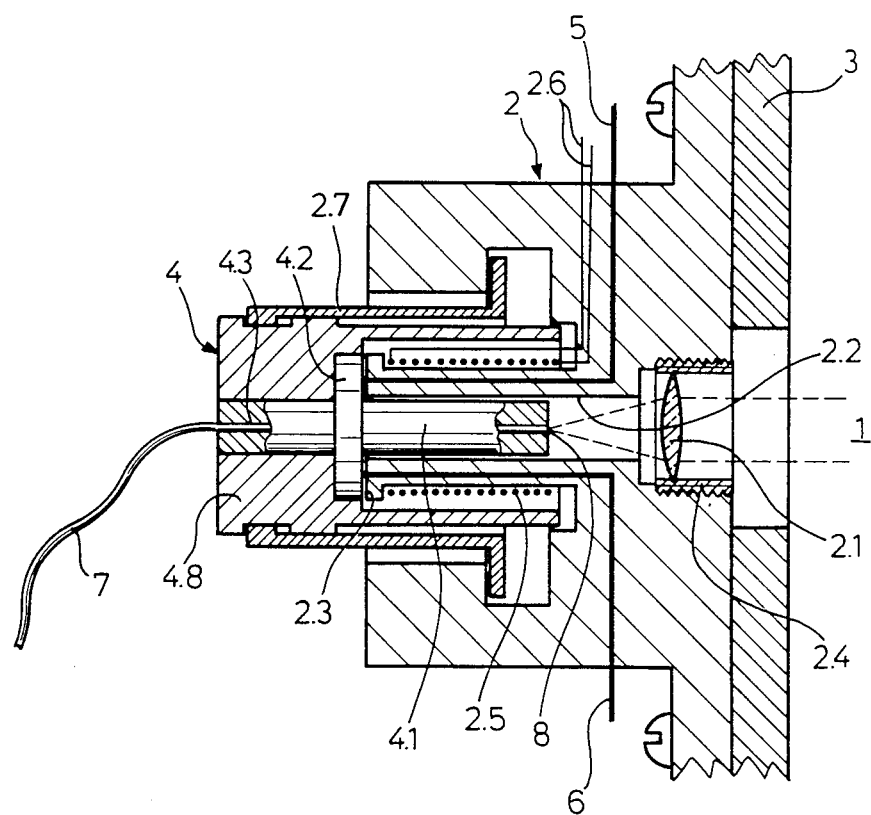
FIG. 1 in a cross sectional view, a self-coupling, electrically monitored detachable connection between a light-guide fiber and laser equipment.

With reference now to the drawings, in the embodiment shown in FIG. 1, the radiation 1 of a laser, not shown in detail, is directed toward an optical coupling system 2.1 which is arranged in a cylindrical opening 2.2 of a metallic coupling element 2 on the laser side. The coupling element 2 is firmly connected to the housing of the laser. Into the cylindrical opening 2.2 is inserted a closely fitting metallic guide pin 4.1 of a coupling element 4 on the light-guide fiber side. The depth of insertion is determined by a shoulder 4.2 of the guide pin 4.1, which in the coupled condition rests flat on a corresponding annular surface 2.3 of the coupling element 2 and ensures good heat transfer between the shoulder 4.2 and coupling element 2. At the same time, two electrical contacts 5 and 6 are short-circuited by the shoulder 4.2 when the connection is in the coupled condition, whereby electrical monitoring of the plug connection is possible. In a central axial borehole 4.3 of the guide pin 4.1, a light-guide fiber 7 is brought through up to the end of the guide pin at the end face. In the plugged-in condition of the connection, the front surface of the light-guide fiber is exactly at the focal point 8 of the optical coupling system 2.1. In order to assure this, the optical coupling system is axially movable in a mounting 2.4 which can be screwed into the coupling element 2.

To aid in making and detaching the connection, means may be provided for generating an axial force on the coupling element 4. In order to generate such an axial pulling force on the coupling element 4, the cylindrical borehole 2.2 may be surrounded by a coil 2.5 which is supplied with current via lines 2.6. To generate a magnetic force, the guide pin 4.1 therefore should comprise a ferromagnetic material; for the coupling elements on the laser side this is not absolutely necessary. For mechanically securing the plug connection, a cap nut 2.7 anchored in the coupling element 2 is provided, which locks to the coupling element 2 a sleeve 4.8 which is connected to the guide pin 4.1 and serves as a protective cap for the end of the light-guide.

Figure 2:
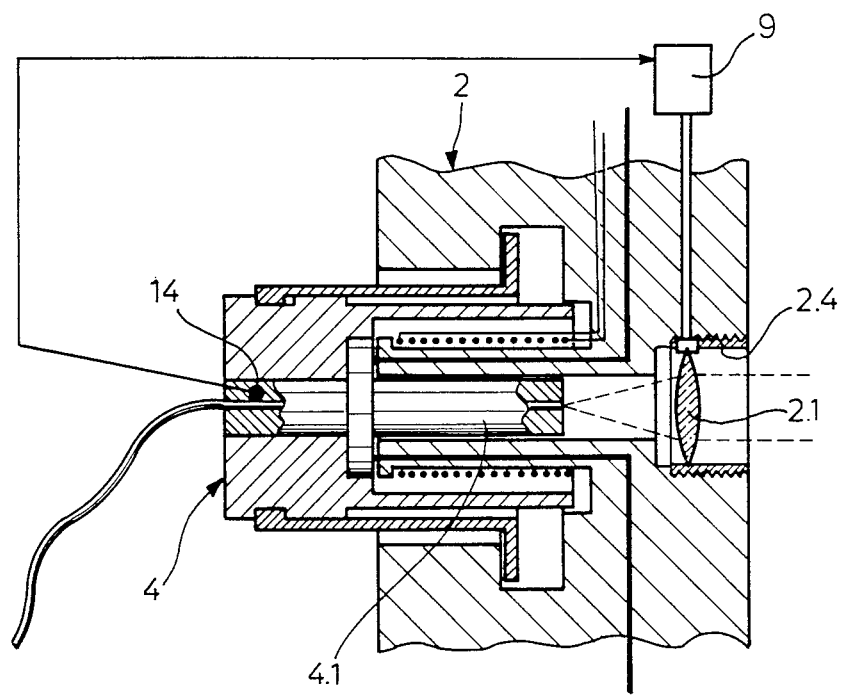
FIG. 2 shows a connection according to FIG. 1 with additional optical self-adjustment by means of a temperature sensor.

In its essential components, the embodiment shown in FIG. 2 is the same as that of FIG. 1; however, for the purpose of self-adjustment of the optical coupling system 2.1, the latter is fastened in an axially movable mounting 2.4 which is moved by an electric drive 9, for instance, comprising an electric motor and associated control circuit. The drive is controlled by a temperature sensor 14 which is fastened in a thermally conducting manner in the guide pin 4.1 of the coupling element 4. The temperature signal is processed in a circuit which is familiar to an expert and is therefore not shown in detail. The circuit 9 steers the drive to a position, at which the temperature in the guide pin reaches a minimum. In this case it can be assumed that optimum coupling of the laser light in the light guide is taking place.

Figure 3:
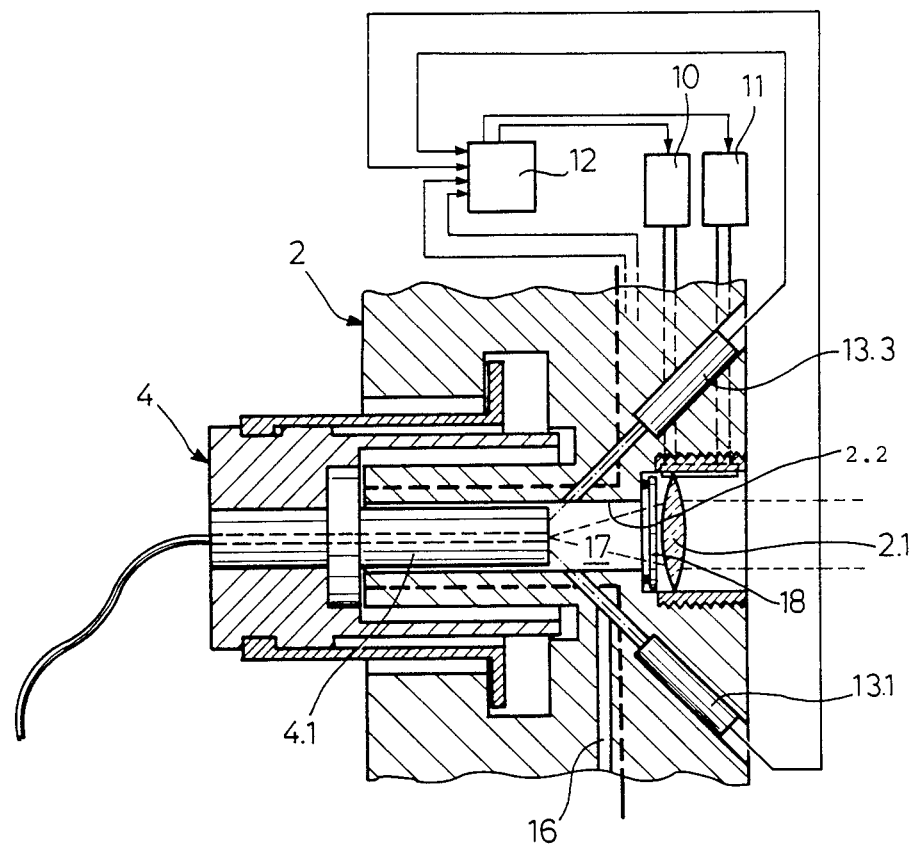
FIG. 3 shows a connection according to FIG. 1 with additional optical self-adjustment by means of photo elements.

The embodiment shown in FIG. 3 again starts out from a connection according to FIG. 1, where four photo elements are provided for the optical self-adjustment, which are aimed at an angle of about 45° toward four regions of the end face of the guide pin 4.1 and correspond approximately to the quadrants of the circular end face. Of the four photo elements, only two (13.1 and 13.3) are visible in the cross-sectional drawing. The photo elements receive the laser radiation which is not coupled by the end face of the guide pin and is therefore reflected and feeds intensity-dependent signals to an electronic circuit 12. The latter controls two electrical control members 10 and 11 by which the optical coupling system 2.1 is moved in the axial and radial direction until the reflected laser radiation furnishes equal signals in all four photo elements and the total amount of the reflected radiation - is a minimum.

The end face of the guide pin 4.1 together with the wall 2.2 and a transparent disc 18 sealed by an O-ring forms a substantially airtight chamber 17 which may be connected to an under- or overpressure generator via a line 16. The connection described is thereby made not only self-plugging but also self-separating.

Should there be no room left in the coupling element 2 for accommodating photo elements, the back-scattered laser radiation could be coupled out and measured by means of a deflection mirror arranged in the ray path.

It is possible, of course, to dispense with the electrical control members and to make the adjustment of the optical coupling manually on the basis of the indicated measurement values.

In the foregoing speclfication, the invention has been described with reference to specific exemplary embodiments thereof. It will, however, be evident that various modifications and changes may be made thereunto witchumt departing from the broader spirit and scope of the invention as set forth in the appended claims. The specification and drawings are, accordingly, to be regarded in an illustrative rather than a restrictive sense.

What is claimed is:

1. A detachable connection between a light-guide fiber and laser equipment, especially for medical purposes, comprising a first coupling element adapted to be attached to the laser equipment and a second coupling element adapted to be attached to the light-guide fiber, said second coupling element being pluggable into a light-exit opening of the first coupling element, an optical transmission means being disposed in the light exit opening of the first coupling element, said optical transmission means being adjustable in at least one of two directions, said two directions comprising a direction parallel to an optical axis of the optical transmission means and perpendicular to the optical axis of the optical transmission means, the first coupling element comprising means for generating an axial force on the second coupling element, thermally conductive contact surfaces being provided between the first and second coupling elements so that heat is transferred from the second coupling element to the first coupling element when said first and second coupling elements are coupled together.

2. The connection recited in claim 1, further comprising control means responsive to a signal from sensing means coupled to one of the first and second coupling element for measuring the radiation intensity of the laser light in the light-guide fiber in the second coupling element, and further comprising means controlled by said control means for moving said optical transmission means in at least one of said directions to improve the coupling of the laser light into the light-guide fiber.

3. The connection recited in claim 2 wherein said sensing means provides a signal inversely related to the radiation intensity of the laser light coupled into the light-guide fiber.

4. The connection recited in claim 3, wherein the sensing means comprises a temperature sensor connected to the second coupling element in a thermally conducting manner such that the sensor provides a minimum signal when optimum coupling of the laser light into the light-guide fiber occurs.

5. The connection recited in claim 2, wherein said sensing means provides a signal proportional to the radiation intensity of the laser light which is not coupled into the light-guide fiber.

6. The connection recited in claim 2, wherein the sensing means comprises at least one photoelectric receiver which receives the laser radiation reflected by the second coupling elementy when in the coupled condition.

7. The connection recired in claim 1, wherein the first coupling element comprises an electrical control means comprising contact means which interrupts an electrical connection if the second coupling element is not completely inserted, said contact means comprising a pair of electrical contacts adapted to be bridged by a further contact means disposed on said second coupling element when said first and second coupling element are completely inserted.

8. The connection recited in claim 1, wherein aid means for generating an axial force comprises magnet means connected to the first coupling element, and wherein the second coupling element comprises ferromagnetic material.

9. The connection recited in claim 8 wherein said magnet means comprises one of an electromagnet and a permanent magnet.

10. The connection recited in claim 1 wherein the first and second coupling elements form a substantially airtight chamber when the first and second coupling elements are inserted together, at least one of an underpressure and overpressure being provided in said chamber for generating an axial force on the second coupling element.

* * * * *